(12) United States Patent
Faure et al.

(10) Patent No.: US 7,248,799 B2
(45) Date of Patent: Jul. 24, 2007

(54) METHOD AND AN IMPROVED DEVICE FOR CONTROLLING THE POWER DELIVERED AT THE OUTPUT OF A NODE OF AN OPTICAL NETWORK THAT SWITCHES BANDS OF WAVELENGTHS

(75) Inventors: Jean-Paul Faure, Paris (FR); Franck Pain, Saint Michel sur Orge (FR)

(73) Assignee: Alcatel, Paris (FR)

( * ) Notice: Subject to any disclaimer, the term of this patent is extended or adjusted under 35 U.S.C. 154(b) by 582 days.

(21) Appl. No.: 10/742,786

(22) Filed: Dec. 23, 2003

(65) Prior Publication Data
US 2005/0276563 A1    Dec. 15, 2005

(30) Foreign Application Priority Data
Dec. 24, 2002    (FR)    .................................. 02 16617

(51) Int. Cl.
*H04B 10/08*    (2006.01)
(52) U.S. Cl. ........................... 398/38; 398/17; 398/19; 398/25; 398/26; 398/27; 398/33; 398/34; 398/45; 398/48; 398/50; 398/56; 398/79; 398/81; 398/82; 398/83; 398/93; 398/94; 398/95; 398/147; 398/158; 398/159; 398/177; 398/181; 398/148; 385/24; 385/37; 385/16; 385/17; 385/18
(58) Field of Classification Search ................ 398/17, 398/18, 92, 19, 94, 20, 158, 25, 159, 26, 398/160, 27, 147, 33, 34, 37, 38, 45, 50, 398/56, 82, 83, 48, 79, 81, 93, 95, 148, 177, 398/181, 24, 16
See application file for complete search history.

(56) References Cited

U.S. PATENT DOCUMENTS

| | | | |
|---|---|---|---|
| 6,173,093 B1 | 1/2001 | Jeal | |
| 6,392,769 B1 * | 5/2002 | Ford et al. | 398/9 |
| 6,426,817 B1 * | 7/2002 | Tomita | 398/82 |
| 6,522,803 B1 * | 2/2003 | Nakajima et al. | 385/24 |

FOREIGN PATENT DOCUMENTS

| | | |
|---|---|---|
| EP | 1 035 680 A2 | 9/2000 |
| EP | 1 043 859 A2 | 10/2000 |
| EP | 1 098 219 A1 | 5/2001 |
| EP | 1 176 747 A1 | 1/2002 |

* cited by examiner

*Primary Examiner*—Hanh Phan
(74) *Attorney, Agent, or Firm*—Sughrue Mion, PLLC

(57) ABSTRACT

A device (D) is dedicated to controlling the power of optical signals in a transparent switching node of an optical communication network that switches bands of wavelengths. The device includes, firstly, a controller (12) for comparing input optical power measurements to a selected first threshold and generating instructions representative of the comparison result, secondly, a measuring device (10A) for delivering measurements representative of the input optical power of the optical signals at one output at least of the switch (4), and thirdly, a processor between the switch (4) and the multiplexer (6) of the node and which control the optical power of the signals coming from the switch (4) as a function of the instructions they receive, so that the optical power of the signals at the input of the multiplexer (6) is maintained substantially constant.

19 Claims, 3 Drawing Sheets

METHOD AND AN IMPROVED DEVICE FOR CONTROLLING THE POWER DELIVERED AT THE OUTPUT OF A NODE OF AN OPTICAL NETWORK THAT SWITCHES BANDS OF WAVELENGTHS

BACKGROUND OF THE INVENTION

The field of the invention is that of optical transmission of signals, more particularly that of controlling the power of optical signals fed into optical fibers at the outputs of switching nodes of an optical network that switches bands of wavelengths.

Transient effects induced by power fluctuations frequently occur in optical fibers fed by transparent switching nodes in reconfigurable optical networks that switch bands of wavelengths. These fluctuations have a number of causes.

First of all, some switching operations applied by the switching nodes to optical signals (wavelengths or bands of wavelengths), for example rerouting from one optical fiber to another, rerouting from one wavelength band of a fiber to another, adding, dropping, or reserving bands, or progressively filling a band, always induce significant power variations in the "downstream" optical fiber concerned that is fed by the operative switching node, and more specifically power variations in other bands in the downstream fiber.

Secondly, faults in the switching matrices of the optical switching nodes generally induce a reduction in the optical power in the downstream optical fiber concerned that is fed by the faulty optical switching node.

Finally, faults (partial or total breaks) in the upstream optical fibers that feed the optical switching nodes generally induce a large power reduction in each downstream optical fiber concerned that are connected to the faulty switching node.

Moreover, regardless of its cause, and because of gain coupling within amplifiers along the optical fiber, any fluctuation in the optical power of some of the channels in a downstream optical fiber systematically affects all the channels already present in the optical fiber. In particular, the disappearance or dropping of certain channels can lead to an increase in the optical power of other channels that, beyond a certain threshold, is liable to generate non-linear effects compromising the transmission of data on those channels.

In an attempt to remedy these drawbacks, it has been proposed to measure defects and the excess optical power in the downstream optical fibers and to maintain the optical power of each channel substantially constant by adjusting the current of the pump lasers in the optical amplifiers (OA) of the downstream optical fiber. It has also been proposed to insert, upstream of the optical fiber amplifiers, a dummy channel generated by a continuous laser emitting optical power at a given frequency and carrying no information.

However, in the event of optical power losses on a large number of optical channels, for example in the event of the complete disappearance of one or more bands, the variation in the optical power at the output of the optical amplifiers induced by adjusting the pump current of the amplifiers may be insufficient to maintain the individual optical power of each channel constant. Furthermore, modifying the current of the pump lasers of the amplifiers, which are erbium-doped fiber amplifiers (EDFA), for example, modifies the operating point of the amplifier, which results in an increase in the noise figure (NF) and degrades the flatness of the amplifier's gain. These two effects impact on the optical performance of the channels passing through the amplifier. Moreover, if rapid optical power compensation is required, adjusting the pump current can cause overshoots or undershoots in the downstream amplifiers.

What is more, although dummy channels can compensate the optical power loss of several channels, or even an entire band, they are of no use if a high overshoot is induced by a sudden increase in the optical power of a band after switching it.

SUMMARY OF THE INVENTION

An object of the invention is therefore to remedy some or all of the above-mentioned drawbacks.

To this end the invention proposes a method of controlling the power of optical signals in a transparent switching node of an optical communication network that switches bands of wavelengths, said node comprising demultiplexing means for feeding demultiplexed optical signals to switching means for feeding demultiplexed optical signals to multiplexing means.

The method comprises the steps of, firstly, measuring the input optical power of the optical signals at one output at least of said switching means, and preferably each output thereof, secondly, comparing the measured input optical power to a selected first threshold and generating instructions representative of the result of the comparison, and, thirdly, controlling the optical power of the signals coming from the switching means and directed to the inputs of the multiplexing means, as a function of the instructions received, so that the optical power of the signals at the input of the multiplexing means is maintained substantially constant.

When the switching means must switch wavelengths or bands of wavelengths, with or without adding wavelengths or bands of wavelengths, it is preferable to start by attenuating the optical power downstream of the output of the switching means, preferably progressively, and before delivering the switched signals, whilst simultaneously feeding auxiliary optical power (or a dummy channel) to the input of the multiplexing means, so that the optical power of the signals at the input of the multiplexing means is substantially constant. Switching is performed after the optical power downstream of the output of the switching means delivering the switched signals has been completely attenuated and replaced in its entirety by a dummy channel, after which the attenuation of the optical power downstream of the output of the switching means is reduced, preferably progressively, whilst simultaneously reducing the auxiliary optical power fed to the input of the multiplexing means, so that the optical power of the signals at the input of the multiplexing means remains substantially constant.

The invention may also be used to manage faults or failures such as switching faults and/or faults on or breaks in the upstream optical fibers feeding the node. This is because, if the result of the comparison is characteristic of this kind of fault, for example a very large reduction in the optical power at the measurement location, or even total elimination thereof, the input of the multiplexing means can be fed with the selected auxiliary optical power, whilst at the same time attenuating the optical power downstream of the output of the switching means, in order to isolate the switching means. In this way the optical power of the signals at the input of the multiplexing means can be maintained substantially constant.

It is preferable to measure the output optical power upstream of the input of the multiplexing means, then compare the output optical power measurement with a selected second threshold to generate auxiliary instructions representative of the comparison result, and finally control the auxiliary power and attenuation as a function of the auxiliary instructions, so that the optical power of the signals at the input of the multiplexing means remains substantially constant.

Moreover, a constant level auxiliary optical power source can be used. However, in this case, the auxiliary optical power fed to the input of the multiplexing means is controlled by applying variable auxiliary attenuation downstream of said source.

The invention also provides a device dedicated to controlling the power of optical signals in a transparent switching node of an optical communication network that switches bands of wavelengths.

The device comprises, firstly, control means for comparing input optical power measurements to a selected first threshold and generating instructions representative of the comparison result, secondly, measuring means for measuring the input optical power of the optical signals at one output at least of the switching means, and, thirdly, processing means between the switching means and the multiplexing means of the node and which control the optical power of the signals coming from the outputs of the switching means as a function of the instructions they receive, so that the optical power of the signals at the output of the device, and therefore at the input of the multiplexing means, is maintained substantially constant.

According to the invention, the processing means comprise at least one optical channel connected to one of the outputs of the switching means and comprising variable attenuation means for attenuating the optical power of the signals on the channel and coupling means connected to variable auxiliary optical power feeding means and to the optical channel downstream of the attenuation means to insert the auxiliary optical power into the optical channel. In this case, the feeding means may comprise a laser or a light-emitting diode having a wider or narrower emission spectrum and delivering a dummy channel at a selected and possibly constant power.

If the optical power is delivered by a constant level auxiliary optical power source, for example a laser, adjustable auxiliary attenuation means are provided, preferably between the source and the coupling means, and attenuate the auxiliary optical power from said source in order to control the auxiliary optical power as a function of the instructions they receive.

Moreover, the measuring means may also measure the optical power of the signals at the output of the processing means. In this case, the control means compare the output optical power measurements with a selected second threshold and generate auxiliary instructions representative of the result of the comparison, and the processing means control the attenuation and the auxiliary optical power as a function of the auxiliary instructions they receive, so that the optical power of the signals at the output of the device remains substantially constant.

The invention also relates to transparent switching nodes equipped with a control device of the type described hereinabove. Each optical connection channel of the node connecting its switching means to its multiplexing means is preferably equipped with a control device of the type described hereinabove.

BRIEF DESCRIPTION OF THE DRAWINGS

Other features and advantages of the invention will become apparent on reading the following detailed description and examining the appended drawings, in which.

The figures constitute part of the description of the invention and can also, if necessary, contribute to the definition of the invention.

DETAILED DESCRIPTION OF THE INVENTION

In an optical communication network that switches bands of wavelengths, whether it is of the Wavelength Division Multiplex (WDM) or of the Dense Wavelength Division Multiplex (DWDM) type, optical signals are conveyed by channels that are associated with different wavelengths that propagate in optical fibers. The channels are grouped into bands that as a general rule are of substantially constant width and in which as a general rule they are equidistant from each other of course, the bands can have different widths and the respective channels can be spaced either regularly, whether identically or otherwise, or irregularly.

Figure 1:
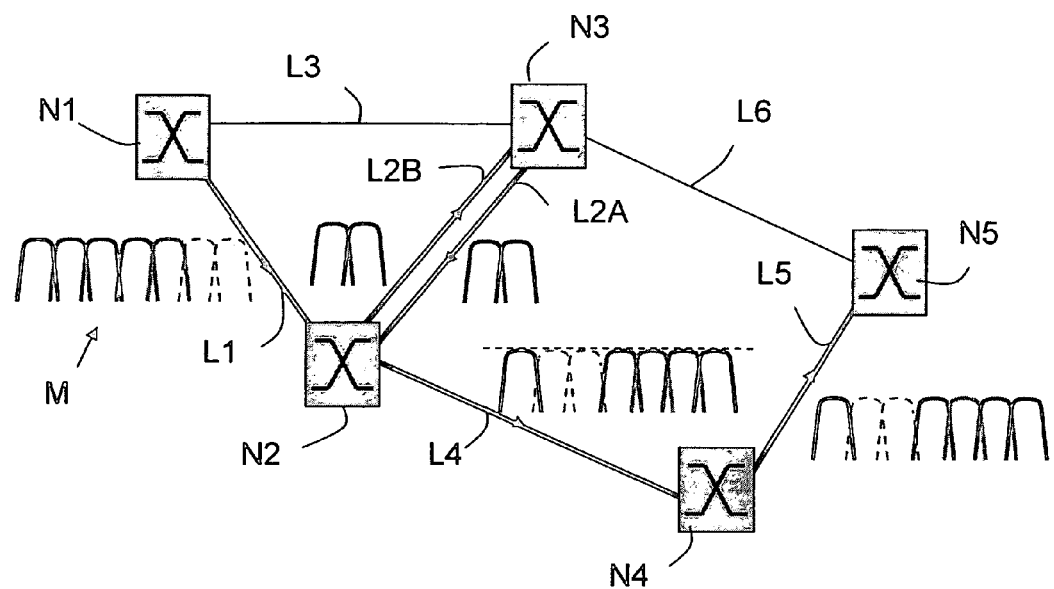
FIG. 1 shows diagrammatically a mechanism for switching bands of wavelengths between different optical nodes in a portion of a transparent network that switches bands of wavelengths.

As shown in FIG. 1, these networks generally comprise a multiplicity of communication equipments referred to as nodes; the nodes Ni (in this example i=1 to 5) are interconnected by optical transmission lines Lj (in this example j=1 to 6). Some of the nodes Ni switch and/or route bands of wavelengths, with or without adding and dropping wavelengths or bands of wavelengths. The switching nodes Ni are generally referred to as cross-connect units.

An optical transmission line Lj, or optical connection as it is otherwise known, generally comprises one or more basic line sub-portions, or transmission spans as they are otherwise known, each span comprising one or more transmission optical fibers, which are connected to an optical amplifier if losses in the fiber must be compensated, and where appropriate dispersion compensating fiber and/or other systems for optimizing the transmission of the channels on said transmission fiber.

In the FIG. 1 example, the network portion shown is adapted to transmit multiplexes comprising seven bands of wavelengths each comprising five equidistant channels, for example. Of course, the invention is not limited to this number of bands of wavelengths or to this number of channels per band.

In this example, the node N2 receives a multiplex comprising five bands of wavelengths from the node N1 via the optical connection L1 and a multiplex comprising two bands of wavelengths from the node N3 via the optical connection L2A. Moreover, the node N2 must switch two of the five bands coming from the node N1 to the node N3 via the connection L2B and the other three bands coming from the node N1 and the two bands coming from the node N3 to the node N4 via the connection L4. Finally, the node N4 switches to the node N5 the five bands coming from the node N2.

If a switching problem arises, for example at the node N2, or if a fault occurs on a connection optical fiber, for example the fiber L2B, transient effects induced by optical power fluctuations arise in the "downstream" optical fiber concerned of the optical connection L4. Similarly, as explained in the introduction, some operations effected on the optical signals at a cross-connect unit Ni, for example re-routing, adding, dropping or reserving bands, or progressive band filling, can induce significant optical power variations in the "downstream" optical fiber concerned fed by that cross-connect unit.

An object of the invention is to avoid these transient effects and these optical power variations in the downstream optical fibers fed by the switching nodes or cross-connect units Ni.

Figure 2:
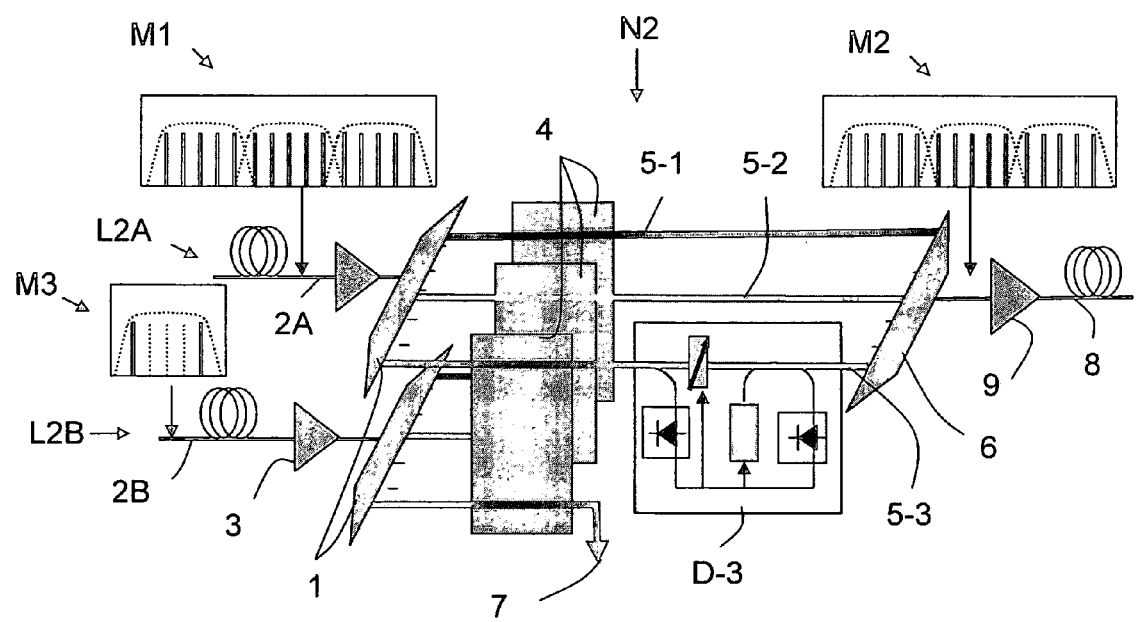
FIG. 2 shows diagrammatically a transparent optical node that switches bands of wavelengths and is equipped with a processing device of the invention.

To this end the invention proposes installing a control device D in a cross-connect unit Ni of the type shown diagrammatically and in part in FIG. 2.

Simplifying, a cross-connect unit Ni comprises a demultiplexer 1 whose inputs are connected to the various upstream optical fibers 2 of the incoming connections Lj via optical amplifiers 3, for example erbium-doped fiber amplifiers (EDFA), and whose outputs feed demultiplexed signals to the inputs of an optical switching matrix 4. The switching matrix 4 has outputs that feed connection optical "channels" 5 respectively connected to the inputs of a multiplexer 6, and drop outputs 7 for dropping one or more bands of wavelengths. Finally, the multiplexer 6 feeds one or more downstream optical fibers 8 via line optical amplifiers 9, for example EDFAs.

In the example shown, the demultiplexer 1 is fed by two optical fibers 2A and 2B and the switching matrix 4 has three outputs for feeding connection optical channels 5-k (in this example k=1 to 3). The cross-connect unit Ni (in this example i=2) is not limited to this embodiment, of course.

Figure 3:
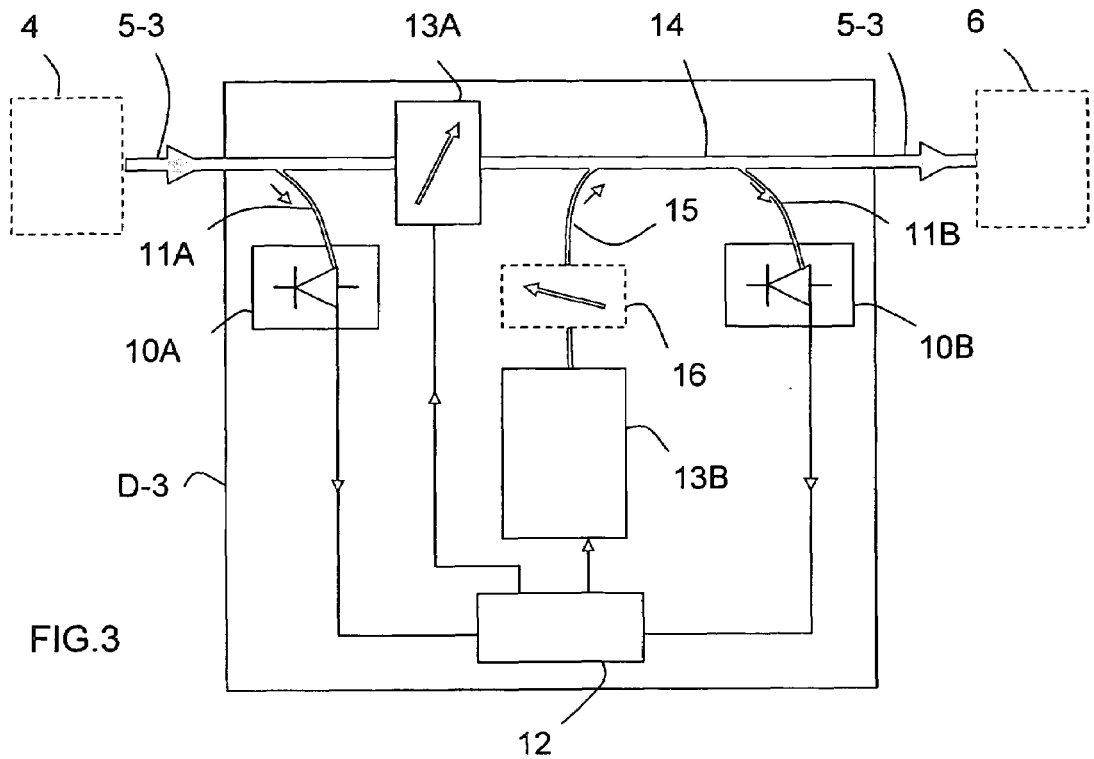
FIG. 3 shows diagrammatically the details of one embodiment of a processing device of invention.

As shown in FIG. 3, the control device D of the invention comprises a first measuring module 10A for measuring the optical power of the optical channels C of a demultiplexed band B delivered to at least one of the outputs of the switching matrix 4. These optical power measurements are referred to as "input" measurements because they are effected at the input of the device D.

Although not shown in the drawings, in order to avoid overcomplicating the figures, it is assumed hereinafter that each connection optical channel 5-k (where k=1, 2, 3, etc.) connecting an output of the switching matrix 4 to an input of the multiplexer 6 is equipped with a control device D-k for controlling the optical power of all the optical channels of the band Bk. This solution avoids transient effects arising between signals associated with different granularities (wavelengths or bands of wavelengths). This is not obligatory, however. A single control device could control all the outputs of the switching matrix 4 apart from the drop outputs 7.

The first measuring module 10A of the device D-k preferably includes a photodiode or any other appropriate detector system connected via a coupler 11A to the upstream portion of the connection optical channel 5-k.

Moreover, it is preferable to provide a second measuring module 10B for measuring the output optical power on the connection optical channel 5-k in the various optical channels C of a demultiplexed band B delivered to at least one of the outputs of the switching matrix 4. These optical power measurements are referred to as "output" measurements because they are effected at the output of the device D-k.

The second measuring module 10B of the device D-k preferably includes a photodiode or any other appropriate detector system connected via a coupler 11B to an auxiliary optical channel 14 (see below), the photodiode or detector system being connected to the downstream portion of the connection optical channel 5-k.

The device D-k also comprises a control module 12 supplied with input optical power measurements by the first photodiode 10A and possibly with output optical power measurements by the second photodiode 10B. The control module 12 compares the input and output optical power measurements with respective selected first and second thresholds and delivers instructions representative of the comparison result.

The control module 12 can be implemented in the form of electronic circuits (hardware), data processing modules (software), or a combination of hardware and software.

Finally, the device D-k includes a processing module 13 at least part of which lies on the connection optical channel 5-k between the output of the switching matrix 4 and the input of the multiplexer 6 and is connected to the control module 12. The processing module 13 controls the optical power of the signals in the various channels on the connection optical link 5-k coming from the switching matrix 4, as a function of instructions generated by the control module 12, so that the optical power of the signals at the output of the device D-k is substantially constant.

As shown in FIG. 3, the processing module 13 preferably comprises an attenuation module 13A connected to the upstream portion of the connection optical channel 5-k downstream of the coupler 11 and to an auxiliary optical channel 14 connected to the downstream portion of the connection optical channel 5-k and a feeding module 13B connected via a coupler 15 to the auxiliary optical channel 14.

The attenuation module 13A is preferably a variable optical attenuator (VOA) for attenuating to a selected level, or even eliminating, as a function of instructions it receives from the control module 12, the optical power of all the channels in the band coming from the output concerned of the switching matrix 4, before they enter the auxiliary optical channel 14.

Moreover, the feeding module 13B is preferably a laser, for example a distributed feedback (DFB) laser, delivering auxiliary or complementary optical power in the form of a dummy channel at a selected given frequency and level, for feeding the downstream portion of the connection optical channel 5-k via the coupler 15 and the downstream end of the auxiliary optical channel 14. However, a light-emitting diode could be used instead of a laser, with a wider or narrower emission spectrum.

The laser 13B can produce a varying power, and its power is selected as a function of instructions or set points it receives from the control module 12. However, the laser 13B could produce a constant power level, as shown in dashed line in FIG. 3. In this case, an auxiliary attenuation module 16, for example a VOA, is provided downstream of the laser 13B for attenuating to a selected level, or even eliminating, the optical power of the dummy channel, as a function of instructions it receives from the control module 12. This avoids any frequency locking problems induced by fast activation or de-activation of the pump current of the laser 13B. The auxiliary attenuation module 16 is preferably between the output of the laser 13B and the coupler 15.

It is also preferable for each attenuation module 13A or 16 to have a relaxation time significantly shorter than that of the downstream amplifiers 9 at the entry of the downstream optical fibers 8, which is typically of the order of one millisecond in the case of an EDFA. Attenuators employing a technology based on fast MEMs or technologies based on semiconductors could be used for this, for example.

Operating modes of a control device D of the invention are described next with reference to FIGS. 2 and 4 to 6.

Figure 4:
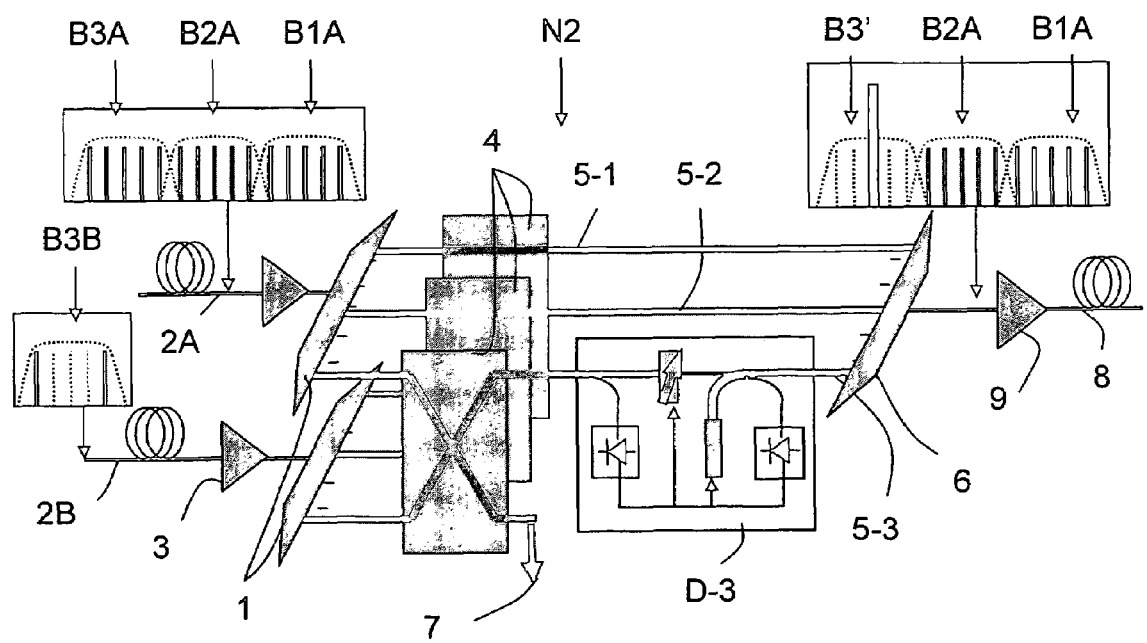
FIG. 4 depicts a first phase of the intervention of a device of the invention in the event of a request for switching bands of wavelengths at its transparent optical switching node.
Figure 5:
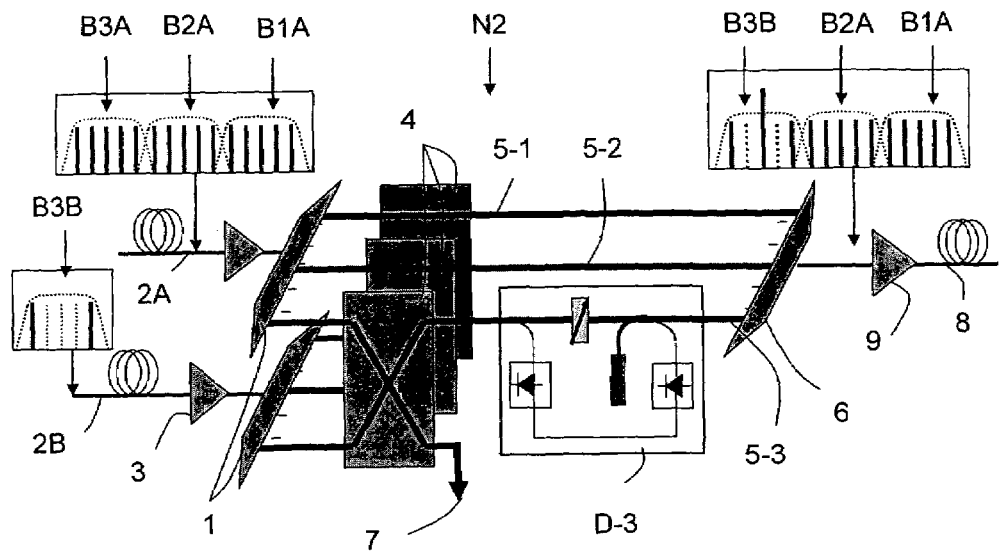
FIG. 5 depicts a second phase of the intervention of a device of the invention in the event of a request for switching bands of wavelengths at its transparent optical switching node.

There is described first, with reference to FIGS. 2, 4 and 5, a normal mode of operation corresponding to a request for switching of bands of wavelengths by the optical switching matrix 4, that request being received from the cross-connect unit N2, for example.

For example, the switching matrix 4 must receive a multiplex M1 comprising three bands B1A to B3A from the upstream optical fiber 2A and a multiplex M3 comprising a band B3B (grouping channels with the same wavelengths as the channels of the band B3A) from the upstream optical fiber 2B and switch the bands B1A, B2A and B3B to the output optical fiber 8 via the connection optical channels 5-1, 5-2 and 5-3, to constitute the multiplex M2, and switch the band B3A to the drop output 7.

Before the switching is effected, the control module 12 instructs the attenuation module 13A to increase the attenuation to a selected value, preferably progressively. At the same time, the control module 12 instructs the laser 13B to increase the power of the dummy channel to a selected value (this assumes that the laser is a variable level laser). This increase in the power of the dummy channel is preferably also progressive, but is related to the attenuation, so as to counterbalance in a substantially constant manner the optical power loss induced by the increase in attenuation.

For example, the selected attenuation corresponds to complete blocking of the signals in the upstream portion of the connection optical channel 5-3 and feeding of a frequency band B3' to the downstream portion of the connection optical channel 5-3 by the dummy channel. These levels are set by the control module 12 on the basis of input optical power measurements supplied to it by the first measuring module 10A.

The result of this two-fold operation (upstream blocking/dummy channel feeding) is represented in FIG. 4 by the band B3' that feeds the downstream optical fiber 8. It can be seen that the band B3' comprises a single channel whose power is selected to compensate the absence of the five channels that a band B3 normally comprises.

With the downstream amplifiers 9 protected from optical power fluctuations at their input, the switching matrix is authorized to reconfigure itself to carry out the above-mentioned switching operations. As shown in FIG. 4, the respective states of the attenuation module 13A and the laser 13B remain unchanged during this reconfiguration phase.

When the switching has been effected, the optical power at the input of the device D-3 of the signals carried by the two end channels of the band B3B in this example is stabilized. The control module 12 then instructs the attenuation module 13A to reduce the attenuation, preferably progressively, and at the same time instructs the laser 13B to reduce the power of the dummy channel in the band B3', preferably progressively. The attenuation is preferably reduced to its minimum value (zero) and the dummy channel power is selected as a function of the number of channels occupied in the band B3B, so that the optical power at the output of the device D-3 remains substantially constant. The aforementioned number being two in this example, the laser 13B continues to deliver a dummy channel compensating for the absence of the other three channels. Of course, if the five channels of the switched band B3B were occupied, the power of the dummy channel delivered by the laser 13B would be zero. The result of this second portion of the switching phase is shown in FIG. 5.

The foregoing description does not refer to the second measuring module 10B, which is used to construct a feedback loop in the device D-k. When a module of this kind is provided, it supplies the control module 12 continuously with measurements representative of the optical power at the output of the device D-k, to be more precise at the output of its auxiliary optical channel 14, so that said control module 12 can adjust the set points sent via instructions to the attenuation module 13A and the laser 13B or the auxiliary attenuation module 16. The adjustment is effected by comparing each output optical power measurement to a selected second threshold and then delivering auxiliary instructions representative of the comparison result.

An abnormal mode of operation described next with reference to FIG. 6 corresponds to a fault on (or a break in) an upstream optical fiber 2A or 2B and/or in a portion of the switching matrix 4, for example the portion feeding the connection optical channel 5-3.

In this case, the input optical power measurements delivered by the first measuring module 10A enable the control module 12 to detect the fault. It then sends instructions (set points) to the attenuation module 13A and the laser 13B so that they conjointly compensate the detected optical power loss induced by the fault.

As in the first switching phase portion, the control module 12 simultaneously instructs the attenuation module 13A to increase the attenuation to a selected value and the laser 13B to increase the optical power of the dummy channel to a selected value (this assumes that the laser is a variable level laser), so that the optical power of the dummy channel exactly counterbalances the optical power loss induced by the fault.

The selected attenuation preferably corresponds to complete blocking of all signals in the upstream portion of the connection optical channel 5-3 and feeding of the downstream portion of the connection optical channel 5-3 by the dummy channel, whose frequency is in a frequency band B3'. These levels are set by the control module 12 on the basis of input optical power measurements supplied by the first measuring module 10A. They can be adjusted by a feedback loop if the device D-3 is equipped with a second measuring module 10B.

Thus the inputs of the downstream amplifiers 9 are protected from optical power fluctuations in the band B3 for as long as the fault persists.

Figure 6:
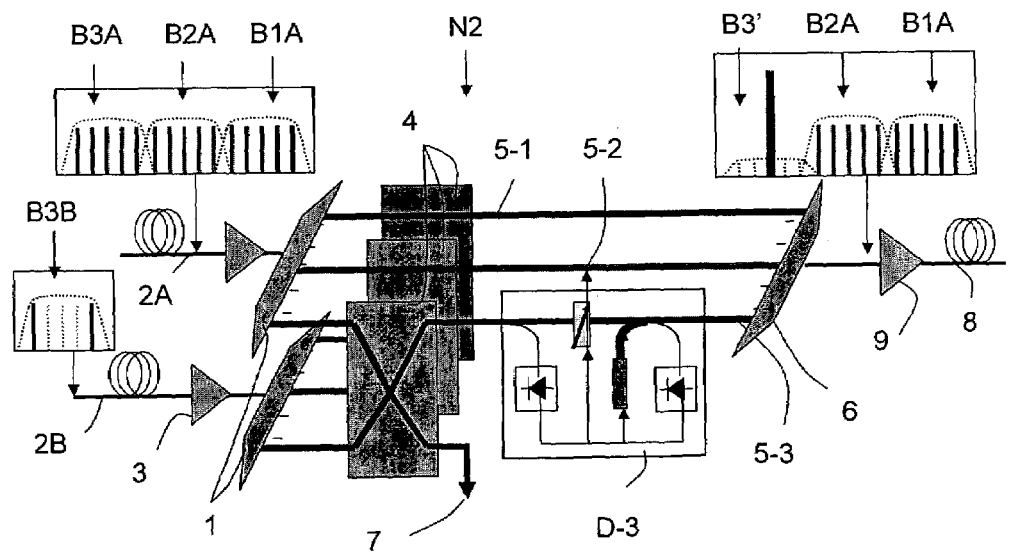
FIG. 6 depicts the intervention of a device of the invention in the event of detection of either a malfunction of the switching matrix of its transparent optical node or a fault on one of the upstream optical fibers feeding said node.

In FIG. 6, the result of this two-fold operation (upstream blocking/dummy channel feeding) is represented by the band B3' that is fed to the downstream optical fiber 8. It can be seen that the band B3' comprises a single channel whose power is selected to compensate the absence of the five channels that a band B3 normally comprises.

The control device can operate either in closed loop mode, and totally independently, or in open loop mode, and be coupled, for example, to measurements of the optical signal-to-noise ratio (OSNR) and/or the power performed at the beginning, middle or end of the downstream fiber, for example by means of optical power or performance monitors (OPM). Optical power control can also be effected by coupling to active gain equalizers (AGE) in the intermediate stage of the downstream line amplifiers, for example.

The invention also provides a method of controlling the power of optical signals in a switching node Ni, for example a cross-connect unit, of an optical communication network that switches bands of wavelengths.

The method can be implemented by at least a control device and a switching node of the type described hereinabove. The main and optical functions and sub-functions provided by the steps of the method being substantially identical to those provided by the means constituting the control device and the node, only the steps implementing the main functions of the method of the invention are summarized hereinafter.

The method consists in, firstly, measuring the input optical power of the optical signals at one output at least of the switching module 4, preferably at each output, secondly, comparing each input optical power measurement to a selected first threshold in order to deliver instructions representative of the result of the comparison, and, thirdly, controlling the optical power of the signals coming from the output of the switching module 4 as a function of the instructions received, so that the optical power of the signals at the input of the multiplexing means is maintained substantially constant.

By means of the invention, it is therefore possible to carry out interfiber rerouting, band adding, dropping or reservation, or progressive band filling, without inducing significant optical power variations in a "downstream" optical fiber fed by a switching node.

Moreover, by means of the invention, it is possible to alleviate the optical power loss induced in "downstream" optical fibers fed by a transparent switching optical node by faults in the switching matrix of said transparent optical node and/or in upstream optical fibers that feed it.

The invention is not limited to the embodiments of the method, control device D and switching node Ni described hereinabove by way of example only, but encompasses all variants thereof within the scope of the following claims that the person skilled in the art might envisage.

The invention claimed is:

1. A method of controlling the power of optical signals in a transparent switching node (Ni) of an optical communication network that switches bands of wavelengths, said node (Ni) comprising demultiplexing means (1) for feeding demultiplexed optical signals to switching means (4) for feeding demultiplexed optical signals to multiplexing means (6), said method comprising the steps of i) measuring the input optical power of the optical signals at one output at least of said switching means (4), ii) comparing the measured input optical power to a selected first threshold and generating instructions representative of the result of said comparison, and iii) controlling the optical power of the signals coming from said switching means (4) as a function of the instructions received, so that the optical power of the signals at the input of said multiplexing means (6) is maintained substantially constant, which method is characterized in that in the event of a request for said switching means (4) to switch bands of wavelengths or in the event of a comparison result representative of a fault, the input of said multiplexing means (6) is fed with a selected auxiliary optical power and the optical power downstream of the output of said switching means (4) is attenuated, so that the optical power of the signals at the input of said multiplexing means (6) is substantially constant.

2. A method according to claim 1, characterized in that, in the event of a request to switch bands of wavelengths, said switching is effected and the attenuation of the optical power downstream of the output of said switching means (4) is reduced whilst at the same time the auxiliary optical power feeding said input of said multiplexing means (6) is reduced, so that the optical power of the signals at the input of said multiplexing means (6) remains substantially constant.

3. A method according to claim 2, characterized in that said optical power is attenuated progressively and said auxiliary power is increased progressively.

4. A method according to claim 2, characterized in that an "output" optical power is measured upstream of the input of said multiplexing means (6), the measured output optical power is then compared to a selected second threshold in order to deliver auxiliary instructions representative of the comparison result, and the attenuation and the auxiliary optical power are controlled as a function of said auxiliary instructions, so that the optical power of the signals at the input of said multiplexing means (6) remains substantially constant.

5. A method according to claim 1, characterized in that, if an auxiliary optical power source of constant level is used, the auxiliary optical power is controlled by variable auxiliary attenuation downstream of said source.

6. A device (D) for controlling the power of optical signals in a transparent switching node (Ni) of an optical communication network that switches bands of wavelengths, said node (Ni) comprising demultiplexing means (1) for feeding demultiplexed optical signals to switching means (4) for feeding demultiplexed optical signals to multiplexing means (6) and said device comprising i) control means (12) for comparing input optical power measurements to a selected first threshold and generating instructions representative of the comparison result, ii) measuring means (10A, 10B) for measuring the input optical power of the optical signals at one output at least of said switching means (4), and iii) processing means (13) at least part of which is between said switching means (4) and said multiplexing means (6) and which control the optical power of the signals coming from said switching means (4) as a function of the instructions they receive, so that the optical power of the input signals of said multiplexing means (6) is maintained substantially constant, which device is characterized in that said processing means (13) comprise at least one optical channel (14) connected to one of the outputs of said switching means (4) and comprising variable attenuation means (13A) for attenuating the optical power of the signals on said channel and coupling means (15) connected to variable auxiliary optical power feeding means (13B) and to said optical channel (14) downstream of said attenuation means (13A) to insert said auxiliary optical power into said optical channel (14).

7. A device according to claim 6, characterized in that said feeding means (13B) comprise a laser which delivers a dummy channel at a selected power.

8. A device according to claim 6, characterized in that said measuring means (10B) measure the output optical power of the signals at the output of said processing means (13).

9. A device according to claim 8, characterized in that said control means (12) compare output optical power measurements with a selected second threshold and generate auxiliary instructions representative of the comparison result and said processing means (13) control the attenuation and the auxiliary optical power of the attenuation means (13A) and the feeding means (13B), respectively, as a function of the auxiliary instructions they receive, so that the optical power of the signals at the input of said multiplexing means (6) is substantially constant.

10. A device according to claim 6, characterized in that said feeding means (13B) comprise a constant level auxiliary optical power source and said processing means comprise variable auxiliary attenuation means (16) adapted to attenuate the auxiliary optical power from said source as a function of the instructions they receive.

11. A transparent switching node (Ni) for an optical communication network that switches bands of wavelengths, said node comprising switching means (4) adapted to be fed with demultiplexed optical signals and to feed multiplexing means (6) via connection optical channels (5-k), which node is characterized in that it comprises at least one control device (D) according to claim 6 connected to said connection optical channels (5-k).

12. A transparent switching node (Ni) according to claim 11, characterized in that each connection optical channel (5-k) is connected to a control device (D-k).

13. A device configured to control the power of optical signals in a transparent switching node of an optical communication network that switches bands of wavelengths, said node comprising a demultiplexer that feeds demultiplexed optical signals to a switching device that feeds demultiplexed optical signals to a multiplexer, said device comprising:
- a controller that compares input optical power measurements to a selected first threshold and generates instructions representative of the comparison result;
- a measuring device that measures the input optical power of the optical signals at one output at least of said switching device; and
- a processor, at least part of which is between said switching device and said multiplexer and which controls the optical power of the signals coming from said switching device as a function of the instructions they receive, wherein the optical power of the input signals of said multiplexer is substantially constant, and further wherein said processor includes at least one optical channel coupled to an output of said switching device, and further includes a variable attenuator that attenuates the optical power of the signals on said channel and a coupling device coupled to a variable auxiliary optical power feeding device and to said optical channel downstream of said attenuator to insert said auxiliary optical power into said optical channel.

14. The device of claim 13, wherein said feeding device comprise a lasers that delivers a dummy channel at a power.

15. The device of claim 13, wherein said measuring device measures the output optical power of the signals at the output of said processor.

16. The device of claim 15, wherein said controller compares output optical power measurements with a selected second threshold and generate auxiliary instructions representative of the comparison result and said processor controls the attenuation and the auxiliary optical power of the attenuator and the feeding device, respectively, as a function of the auxiliary instructions, so that the optical power of the signals at the input of said multiplexer is substantially constant.

17. The device of claim 13, wherein said feeding device comprises a constant level auxiliary optical power source and said processor comprises a variable auxiliary attenuator adapted to attenuate the auxiliary optical power from said source as a function of the instructions.

18. A transparent switching node for an optical communication network that switches bands of wavelengths, said node comprising said switching device adapted to be fed with demultiplexed optical signals and to feed said multiplexer via connection optical channels, wherein said node comprises at least one control device according to claim 13 coupled to said connection optical channels.

19. A transparent switching node according to claim 18, wherein each connection optical channel is coupled to a control device.

* * * * *